United States Patent
Cahisa Gallardo et al.

(10) Patent No.: US 8,832,865 B2
(45) Date of Patent: Sep. 16, 2014

(54) INSULATING GARMENT

(75) Inventors: David Cahisa Gallardo, Hospitalet de Llobregat (ES); Oscar Deumal Rubio, Canet de Mar (ES); Sergi Rexach Alabart, Barcelona (ES)

(73) Assignee: Sutran I Mas D, S.L., Barcelona (ES)

( * ) Notice: Subject to any disclaimer, the term of this patent is extended or adjusted under 35 U.S.C. 154(b) by 0 days.

(21) Appl. No.: 13/504,441

(22) PCT Filed: Nov. 26, 2010

(86) PCT No.: PCT/ES2010/070779
§ 371 (c)(1),
(2), (4) Date: Jun. 29, 2012

(87) PCT Pub. No.: WO2011/080368
PCT Pub. Date: Jul. 7, 2011

(65) Prior Publication Data
US 2012/0272438 A1    Nov. 1, 2012

(30) Foreign Application Priority Data
Dec. 29, 2009  (ES) .................................. 200931288
Sep. 13, 2010  (ES) .................................. 201031360

(51) Int. Cl.
*A41D 27/02* (2006.01)
*A41D 27/28* (2006.01)
*A41D 31/00* (2006.01)
*D04H 13/00* (2006.01)

(52) U.S. Cl.
CPC ........ *A41D 31/0038* (2013.01); *A41D 2400/60* (2013.01); *D04H 13/00* (2013.01)
USPC ................. 2/93; 2/97; 2/458; 2/87; 442/79; 442/118; 442/304

(58) Field of Classification Search
None
See application file for complete search history.

(56) References Cited

U.S. PATENT DOCUMENTS

| | | | | |
|---|---|---|---|---|
| 4,733,546 | A * | 3/1988 | Toda | 66/202 |
| 5,065,600 | A * | 11/1991 | Byles | 66/193 |
| 5,291,617 | A * | 3/1994 | Moretz et al. | 2/400 |
| 5,312,667 | A * | 5/1994 | Lumb et al. | 428/91 |
| 5,319,807 | A * | 6/1994 | Brier | 2/239 |
| 5,364,678 | A * | 11/1994 | Lumb et al. | 428/96 |
| 5,414,870 | A * | 5/1995 | Moretz et al. | 2/400 |
| 5,435,014 | A * | 7/1995 | Moretz et al. | 2/403 |
| 5,508,098 | A * | 4/1996 | Omar et al. | 442/319 |
| 5,787,503 | A * | 8/1998 | Murphy, III | 2/90 |
| 5,840,675 | A * | 11/1998 | Yeazell | 510/417 |
| 6,509,285 | B1 * | 1/2003 | Yeh | 442/195 |
| 7,314,840 | B2 * | 1/2008 | Baychar | 442/370 |
| 7,682,994 | B2 * | 3/2010 | Van Emden et al. | 442/181 |
| 2002/0155771 | A1 * | 10/2002 | Soane et al. | 442/79 |

(Continued)

Primary Examiner — Bobby Muromoto, Jr.

(57) ABSTRACT

An insulating garment includes an inner fabric having a knitted laminar structure adapted to absorb perspiration of a user. The inner fabric utilizes polymer fibers and a mixture of polyamide and polyester multifilaments present in an amount of between 30-50% and have a thickness between 0.3-3 dtex. An outer fabric has a knitted laminar structure and an inner surface including a moisture repellent finish adapted to repel perspiration of a user. The outer fabric utilizes polyester-brushed cotton threads in an amount of between 40-60% of the fabric. The end portions of the inner and outer fabrics are stitched together to form an air chamber there between. In use, perspiration from a user is absorbed by the inner fabric into the air chamber, where it can evaporate.

3 Claims, 3 Drawing Sheets

(56) References Cited

U.S. PATENT DOCUMENTS

| | | |
|---|---|---|
| 2003/0181118 A1* | 9/2003 | Ko et al. ............... 442/335 |
| 2004/0058102 A1* | 3/2004 | Baychar ................ 428/34.1 |
| 2004/0120921 A1* | 6/2004 | Quincy et al. ......... 424/76.21 |
| 2005/0101209 A1* | 5/2005 | Li et al. ................ 442/118 |
| 2006/0177645 A1* | 8/2006 | Baychar ............... 428/304.4 |
| 2008/0096001 A1* | 4/2008 | Emden et al. .......... 428/222 |
| 2008/0131648 A1* | 6/2008 | Baychar ............... 428/90 |
| 2010/0009112 A1* | 1/2010 | Baychar ............... 428/90 |
| 2011/0092935 A1* | 4/2011 | Hann .................... 604/367 |
| 2012/0276332 A1* | 11/2012 | Conolly et al. ........ 428/138 |

* cited by examiner

INSULATING GARMENT

BACKGROUND OF THE INVENTION

1. Object of the Invention

This invention refers to an insulating garment designed to absorb the user's perspiration in its interior, avoiding transmission to the outside.

Additionally, another of the object of the present invention is to provide an insulating garment with an air chamber which separates the outer fabric from the inner fabric.

2. State of the Art

There are currently numerous garments that transport perspiration, to avoid the accumulation of moisture in contact with the body. These garments are mainly used and designed for use in activities which require physical effort, so that the moisture generated during perspiration does not accumulate on the inside, in contact with the body, but rather goes to the outside, and thus avoids the accumulation of perspiration in contact with the body.

However, these types of garments are not applicable for clothes in daily use, which need to hide the perspiration so that the moisture generated is not seen on the outside, mainly for people affected by hyperhidrosis, which causes the sweat glands to generate more perspiration than normal.

For the aforementioned cases, there are adhesive cotton or cellulose elements on the market, which are placed under the clothes to absorb perspiration without dampening the garments, but they are very thick and very uncomfortable to wear.

Patent PCT WO 0155500 refers to a "textile surface" for dresses, the outer face having received a hydrophobic process that repels moisture, and the inner surface having received a hydrophilic process to absorb the moisture. According to the invention, the outer face of the textile surface offers sufficient protection against the rain. The inner hydrophilic layer absorbs the moisture, which is released by the person wearing the garment. This mentioned textile surface may be manufactured in threads and fibres of mono and multifilaments.

French invention patent no. 2,503,743 describes and claims a textile structure formed by two layers linked to each other by interweaving, so that the layer which is not in contact with the skin is formed by moisture absorbing fibres, such as cotton, and the layer which is in contact with the skin is formed by polyamide and polyester fibres.

Spanish invention patent no. 2,139,590 describes and claims a compound fabric that is windproof, permeable to steam, drapeable, and extensible or elastic, which comprises an outer textile surface to provide wind proofing and waterproofing while providing at the same time transport of water vapour through a process of absorption-distribution-desorption. A hydrophilic barrier layer of polyurethane is placed over the external layer of textile located on a barrier layer, the barrier layer being at least one of the outer layer or an inner layer of fabric, wherein the barrier layer is a knitted fabric with a brushed surface.

Finally, U.S. patent no. 2004/048,500 refers to a fabric formed by two superimposed layers, the internal layer is in contact with the skin and composed of synthetic fibres with a small amount of filaments which enable the evacuation of water molecules by capillary action from the skin to the outside. The outer layer is manufactured with hollow synthetic fibres that evacuate the water molecules of the inner layer to the outside, and also offer good thermal insulation.

The aforementioned precedents that are a part of the state of the art, differ with regard to the present invention in the type of fabric used, the number of pieces of fabric that form a certain garment, the purpose of the garment, the finish of the outer fabric, the finish of the inner fabric, and the fibres used in this fabric, as well as the finish given to the fabric and the fibres and strands in this fabric when it is woven.

BRIEF SUMMARY OF THE INVENTION

The success of a first series of garments sold by the inventor, and the satisfaction of customers that used them, have led the inventor to research into the different possible structures of the cloth utilized, both the outer and the inner fabric. The details of the fabric utilized in the main original patent were not specified. The inventor conducted research in order to optimize the values initially achieved in the process of evaporation of the perspiration in the inner fabric, without leaving aside that the improved garment is improved with the same objective explained initially, namely to provide a solution to people affected by "hyperhidrosis", which causes sweat glands to generate more perspiration than normal.

Within the aforementioned possible structures, research has been carried out as to which structures, making use of the physicochemical properties of synthetic polymers to be used in them, are the best for the laminar structure of the inner fabric in contact with the skin.

In addition to research on the inner fabric, experiments have also been carried out with other outer fabrics. There is habitually a certain tendency in the textile world and in users to generally use conventional cotton t-shirts, convinced that as this is natural fibre, it will be more comfortable. Initially, the use of cotton for the outer fabric of the garment was ruled out as a consequence of different shrinkage values of the two fabrics (inner and outer) when washed. However laboratory tests and field test validations have revealed that, according to the results obtained when manufacturing the laminar structure of the outer fabric with strands of polyester-cotton, the outer fabric has the same technical performance as cotton with a longer life when the product is used continuously, with easier drying, and easy maintenance and comfort.

Another of the aims of the improvements to the initial invention is the achievement of an inner chamber between the two fabrics of the garment, with the aim of achieving a high value of distribution coefficient of perspiration, via the structure of the inner fabric, making it migrate to the evaporation chamber. After several studies, it was determined that the best way to join the two fabrics and consequently the garment, is by stitching them together with thread of very low coefficient of perspiration distribution, joining the two fabrics only by their ends, thus increasing the physical area of the air chamber between the inner and outer fabrics.

The inventor offers a solution to the aforementioned problems, by means of an insulating garment formed by two fabrics, comprising at least:

An inner surface of fabric with hydrophilic finish and,

An outer surface of fabric with a moisture-repellent finish.

The garment may be comprised of an inner surface of a texturized polyester fabric in micro-fibre and polyamide presented in multi-filaments, with a hydrophilic finish, and an outer surface of a fabric the same or different than that of the inner surface, but with a moisture-repellent finish. If the outer surface is made of a different material, it could be made of brushed cotton and texturized polyester, with a moisture-repellent finish.

The main feature of the inner fabric is that it increases the absorption of liquids, and the main feature of the outer fabric is to repel liquid in part, while being easily washable and also breathable.

A series of improvements are included, which were obtained after multiple lines of research carried out on all the elements and parts in the initial invention, i.e., threads, fibres, stitches, finishes. The improvements include the creation of an air chamber between the two laminar structures of the inner and the outer fabric, which in addition to holding the moisture generated as a consequence of the user's perspiration, allows its subsequent evaporation.

Therefore, the garment of the present invention is comprised of an inner fabric formed by a knitted laminar structure, woven with fibres obtained from synthetic polymers, so they absorb the perspiration, taking it inside, without leaving it on the surface of these fibres. Thus, the inventors achieve a coefficient of perspiration distribution via the structure to the evaporation chamber, with a value very close to 1. The chemical composition, sectional profile, and additives included at the moment of extrusion of the multifilaments, effect the coefficient of perspiration distribution.

Best laboratory results were obtained with a specific mixture of multifilaments of polyamide and polyester, with a low content of matting agent, and with additives to reduce the formation of electrostatic charges by 10-20%, and giving the thread used a fibre-fibre friction and fibre-metal coefficient suitable for good comfort in the use of the garment, and good processability in the textile processes and in the industrial manufacturing of the garment, reducing the absorption of solid particles.

With this aim, a range of chemical finishing products were selected, chemically compatible with each other, which give optimum results in friction tests and laboratory comfort simulation tests.

Different families of polyester and polyamide polymers have been characterised by scanning electron microscopy (SEM) until, in close collaboration with the producers of multifilaments, the most suitable from the point of view of surface type were chosen.

The number of strands is average for those used in the manufacturing of conventional t-shirts, with a strong tendency to finer strands around 20% finer than the lineal structures used in conventional garments, taking into consideration that the new garment is based on a complex structure of two fabrics, and that it must have comfort coefficients equal to or greater than those of conventional garments.

The multifilaments selected are given the technical name of microfibers, with a thickness of less than 1 decitex (dtex) (mass in grams of 10,000 meters) in all cases. In the validation tests performed, a final chemical treatment of the knitted laminar structure was shown to give the structure the maximum increased hydrophilic nature, in a statistically significant form at 95% of level of confidence, as well as a desirable coefficient of diffusion of the perspiration from the skin to the evaporation chamber. Thus, with this structure, very low shrinkages after washing and ironing were obtained (i.e., less than 1.1%), an indispensable factor so that the resulting structure of the t-shirt is stable, and so that the user will have no problems with respect to any change in initial size during normal use of the garment.

The garment, in addition to the fabric described above in all its parameters, has an outer fabric, manufactured with a knitted laminar structure with strands of polyester-cotton, giving the product the same technical performance and longer life when in continuous use. This structure offers very low shrinkage values after washing and ironing (i.e., less than 1.0%). A specific chemical processing of the external knitted laminar structure gives it the necessary waterproofing properties, i.e., close to 0, to favour the process of greater than 95% elimination of perspiration and avoid staining of the garment.

Finally, another improvement is the creation of a chamber between the outer and the inner fabrics, which is fundamental in the physical-chemical process of evaporation of perspiration. This chamber is created through a physical sealing, without needing to apply temperature or specific chemical products, which is carried out through a stitching with threads that have a very low coefficient of diffusion to join the ends of the fabric, thus increasing the physical area of air in the chamber between the two basic fabrics.

Below is a list of the different parts of the invention, that can be seen in the annexed drawings, and are indicated with their respective numbers; (1-2) surfaces, (10) garment, (11) inner fabric, (12) outer fabric, (12.1) inner surface of the outer fabric (12), and (13) air chamber.

Other details and characteristics shall be shown throughout the description below referring to drawings attached to this report which are shown for illustrative but not limiting purposes only in a drawing of the invention.

DETAILED DESCRIPTION OF THE INVENTION

The garment represented in FIGS. 1-4 is composed of two surfaces (1 and 2) with sides that enable the perspiration generated by the user's body not to pass to the outer layer.

Figure 1:
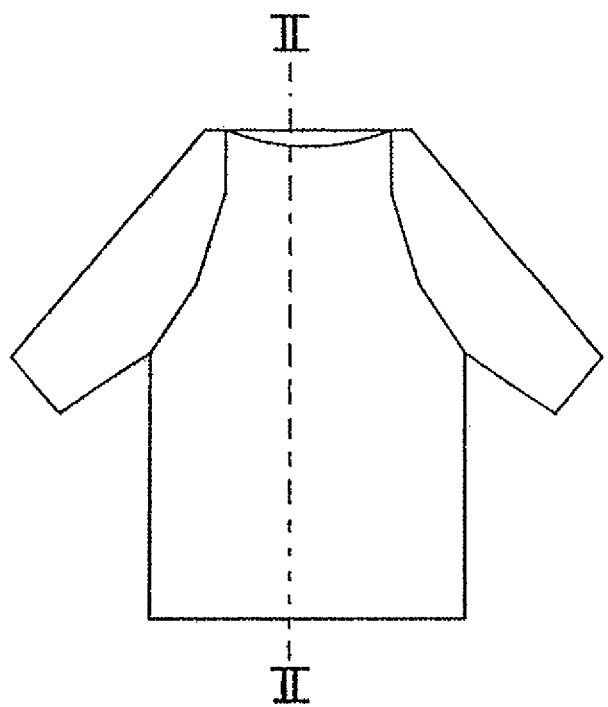
FIG. 1 shows an elevation view of the insulating garment of the invention.
Figure 2:
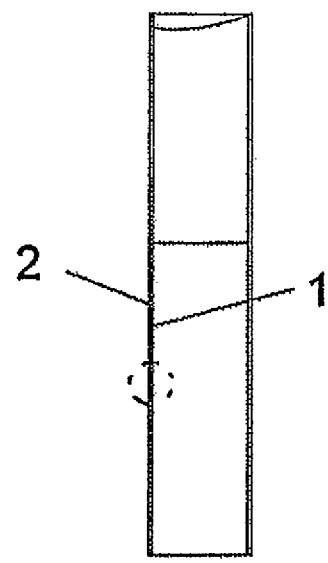
FIG. 2 shows a section through II-II of FIG. 1.
Figure 3:
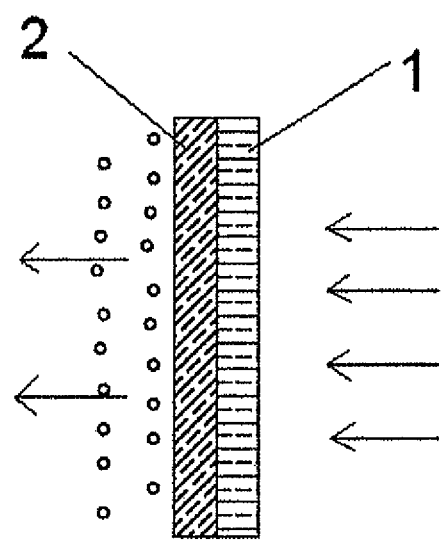
FIG. 3 shows a detail of FIG. 2, for the case in which the insulating garment is composed of two different fabrics for the inner and outer surfaces.

FIG. 3 shows a detail of FIG. 2, in which it can be seen that the garment is composed of cloth with an inner layer (1) in direct contact with the body, of a fabric made by combining texturized polyester in micro-fibres and polyamide presented in multi-filaments, to which a thermofixing process has been applied in a tenter frame machine and a hydrophilic finish has been applied to increase the absorption of fluids.

The outer surface (2) of the garment is made of brushed cotton and texturized polyester, to which a thermofixing process has been applied in a tenter frame machine, which repels fluids to a certain extent, the outer surface (2) being washable without problems and at the same time being breathable.

Figure 4:
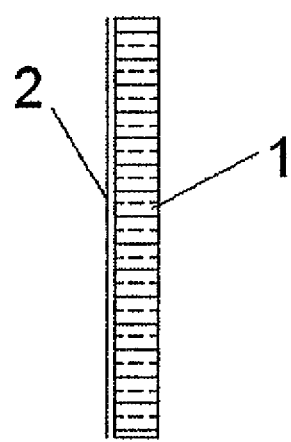
FIG. 4 shows a detail of FIG. 2, for the case in which the insulating garment is composed of the same fabric for the inner and outer surfaces.

FIG. 4 shows a second preferred embodiment in which the garment is made with an inner surface (1) having a fabric with an absorption capacity composed of texturized polyester in micro-fibre and polyamide presented in multi-filaments, to which a thermofixing process has been applied in a tenter frame machine and a hydrophilic finish has been applied. Additionally, an outer surface treatment has been applied (2), which gives waterproof and breathable properties to an outer surface of the fabric (2).

Figure 5:
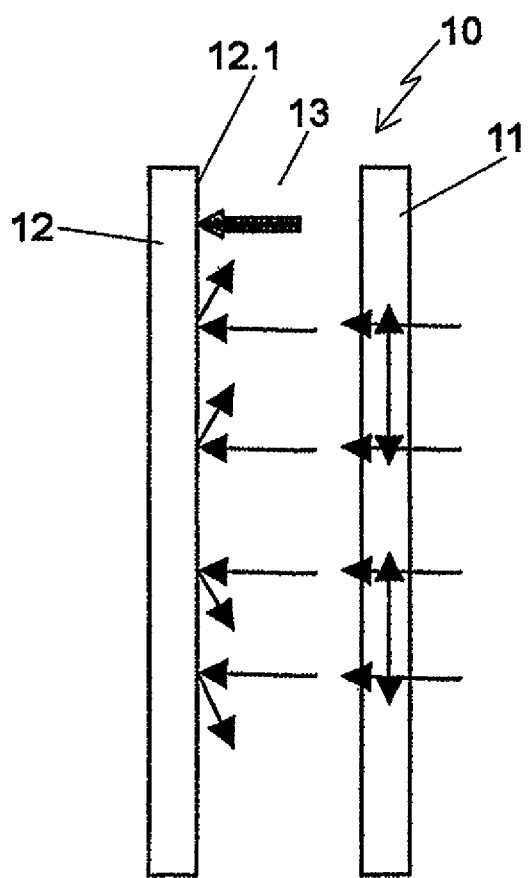
FIG. 5 is a simplified front elevation view of an insulating garment of the present invention wherein the outer surface has received a water repellent treatment for moisture, and the inner surface has received a hydrophilic moisture absorbent treatment.

In one of the alternative embodiments of the invention, as can be seen in FIG. 5, the garment (10) comprises:

An inner fabric (11) with a laminar knitted structure that absorbs perspiration.

An outer fabric (12) with a laminar knitted structure, repelling perspiration by its inner surface (12.1).

An air chamber (13) between the inner (11) and outer fabrics (12).

The laminar structure of the inner fabric (11) will be manufactured by knitting, using synthetic polymer fibres, with a specific mixture of multifilaments of polyamide-polyester, with each of the polyamide and polyester components being present at a percentage between 30% and 60%, wherein the multifilaments have a thickness between 0.3 dtex and 3 dtex.

The laminar structure of the outer fabric (12) will be knitted with strands of polyester-cotton with a percentage which is between 40% and 60%, and number between 14/1 Nm and 50/1 Nm.

The chosen polymers have a good resistance to abrasion, and very low tendency to pilling (formation of balls during normal use of the T-shirt). No chemical agent which could be the cause of allergies or skin problems has been used in the manufacturing process of the internal structure of the T-shirt.

The joining of the inner (11) and the outer (12) fabrics to form a chamber (13) is done with stitches joining only the ends of the fabrics during the manufacturing of the garment, using strands having a very low coefficient of distribution. These strands may be of treated cotton or synthetic material.

The ingredients of the microfilaments, and the their optimum amount, along with the most appropriate twisting to form the synthetic polymer fibres for the inner fabric (11) have been obtained by mathematical systems for programming experiences, which have been optimised using the following mathematical formula:

$$\emptyset ei = \emptyset [\emptyset 1, \emptyset 2, \emptyset 3, \emptyset 4, \emptyset 5]$$

Being, $\emptyset$ ei: the parameters resulting from the inner laminar structure
$\emptyset 1$: variable of the legal moisture rate result of the microfilaments that make up the linear structure
$\emptyset 2$: variable of the section profile of the microfilaments
$\emptyset 3$: variables of the additives which regulate the potential of electrostatic charge
$\emptyset 4$: variable which regulates the interfibrillar fibre-fibre friction of the polymers of the mixture of the linear structure
$\emptyset 5$: variable which regulates the interfibrillar fibre-metal friction of the polymers of the mixture of the linear structure The mathematical conditioning factors which regulate the laws of the inner knitted laminar structure, respond to the next mathematical equation, which has been optimised:
$\emptyset ee = \emptyset [\emptyset 1, \emptyset 2, \emptyset 3, \emptyset 4]$
Being, $\emptyset$ ee: the parameters resulting from the outer laminar structure
$\emptyset 1$: variable of the linear mass of the linear structure of the microfilaments
$\emptyset 2$: variable of the torsion of the linear structure of the microfilaments
$\emptyset 3$: variables of the percentage of mixture of the microfilaments of polyamide and polyester
$\emptyset 4$: variable which regulates the thread structure according to the system of spinning used to obtain the strand of short fibres Additionally, the outer fabric (12) and its laminar structure, will receive a treatment on its inner surface to offer greater perspiration repellent properties in liquid form.

Having sufficiently described this invention using the Figure attached, it is easy to understand that any changes judged to be suitable may be made, whenever these changes do not alter of the scope of the invention summarised in the following claims.

The invention claimed is:

1. An insulating garment designed to absorb a user's perspiration in its interior and avoid transmission to its exterior, comprising:
    an inner fabric having a knitted laminar structure adapted to absorb perspiration of a user, wherein the laminar structure of the inner fabric comprises polymer fibers including a mixture of polyamide and polyester multifilaments, wherein each of the polyamide and polyester components are present in an amount of between 30-50% of the multifilaments, and wherein the polyamide and polyester multifilaments have a thickness between 0.3-3 dtex;
    an outer fabric having a knitted laminar structure and an inner surface including a moisture repellent finish adapted to repel perspiration of a user, wherein the laminar structure of the outer fabric comprises polyester-brushed cotton threads in an amount of between 40-60% of the fabric; and
    an air chamber defined between the inner and outer fabrics.

2. The insulating garment of claim 1, further comprising:
    Stitching joining only end portions of the inner and outer fabrics together to form the air chamber, wherein the stitching utilizes threads with a very low distribution coefficient and a weight of between 14/1 Nm and 50/1 Nm.

3. The insulating garment of claim 1, wherein inner fabric further comprises a hydrophilic finish to increase moisture absorption.

* * * * *